US011723297B2

(12) United States Patent
Leopold et al.

(10) Patent No.: US 11,723,297 B2
(45) Date of Patent: Aug. 15, 2023

(54) SOIL CULTIVATION DEVICE

(71) Applicant: Thomas Hatzenbichler Agro-Technik GmbH, St. Andrae im Lavanttal (AT)

(72) Inventors: Juergen Leopold, St. Stefan (AT); Daniel Koglek, Maria Rojach (AT); Thomas Hatzenbichler, St. Andrae im Lavanttal (AT)

(73) Assignee: THOMAS HATZENBICHLER AGRO-TECHNIK GMBH, St. Andrae im Lavanttal (AT)

( * ) Notice: Subject to any disclaimer, the term of this patent is extended or adjusted under 35 U.S.C. 154(b) by 483 days.

(21) Appl. No.: 15/931,912

(22) Filed: May 14, 2020

(65) Prior Publication Data

US 2020/0359540 A1    Nov. 19, 2020

(30) Foreign Application Priority Data

May 16, 2019   (AT) .................................. A 184/2019

(51) Int. Cl.
*A01B 19/02* (2006.01)
*A01B 23/02* (2006.01)
*A01B 61/04* (2006.01)

(52) U.S. Cl.
CPC .............. *A01B 19/02* (2013.01); *A01B 23/02* (2013.01); *A01B 61/046* (2013.01)

(58) Field of Classification Search
CPC ......... A01B 19/00; A01B 19/02; A01B 19/04; A01B 19/06; A01B 19/08; A01B 23/02; A01B 23/04; A01B 25/00; A01B 61/046
See application file for complete search history.

(56) References Cited

U.S. PATENT DOCUMENTS

| 2,360,022 A | * | 10/1944 | Troyer | A01B 19/02 172/635 |
| 3,016,958 A | * | 1/1962 | Knapp | A01B 19/02 172/639 |
| 3,043,377 A | * | 7/1962 | Urben | A01B 23/02 172/657 |
| 5,492,182 A | | 2/1996 | Delaurier | |
| 5,988,291 A | | 11/1999 | Yeomans | |
| 6,164,386 A | | 12/2000 | Delaurier | |

(Continued)

FOREIGN PATENT DOCUMENTS

| AT | 15980 U1 * | 10/2018 | ............. A01B 19/02 |
| CN | 110149814 A * | 8/2019 | |

(Continued)

OTHER PUBLICATIONS

Search Report issued in European Patent Application No. 20 172 749.2 dated Oct. 8, 2020 with English machine translation provided.

(Continued)

*Primary Examiner* — Jamie L McGowan
(74) *Attorney, Agent, or Firm* — Nixon & Vanderhye

(57) ABSTRACT

In the case of a soil cultivation device with multiple harrow tines, the harrow tines are fastened to levers, which are mounted to pivot on tie bars of the supporting frame via carriers. The operating position of the harrow tines is defined by the levers being adjacent to tie bars, and the harrow tines are prestressed into the operating position by springs assigned to them in the form of pneumatic cylinders.

20 Claims, 6 Drawing Sheets

(56) References Cited

U.S. PATENT DOCUMENTS

| | | | |
|---|---|---|---|
| 6,250,398 B1 | 6/2001 | Zaun et al. | |
| 2008/0066935 A1* | 3/2008 | Becker | A01B 63/32 172/13 |
| 2012/0073844 A1* | 3/2012 | Friesen | A01B 63/32 172/452 |
| 2016/0234994 A1* | 8/2016 | Gray | A01B 63/008 |
| 2016/0249521 A1* | 9/2016 | Sudbrink | A01B 63/22 172/407 |
| 2017/0112043 A1* | 4/2017 | Nair | A01B 33/08 |
| 2018/0139883 A1* | 5/2018 | Lung | A01B 63/28 |
| 2018/0310465 A1* | 11/2018 | Peterson | A01B 63/008 |
| 2018/0310466 A1* | 11/2018 | Kovach | G01D 5/12 |
| 2019/0045700 A1* | 2/2019 | Knobloch | A01B 61/046 |
| 2021/0105927 A1* | 4/2021 | Schoels | A01B 19/10 |

FOREIGN PATENT DOCUMENTS

| | | | |
|---|---|---|---|
| DE | 19956953 | 6/2000 | |
| DE | 10 2015 107 648 A1 | 11/2016 | |
| DE | 102016107951 | 11/2017 | |
| EP | 983715 A2 * | 3/2000 | A01B 35/18 |
| EP | 1 961 283 | 8/2008 | |
| EP | 3 097 753 A1 | 11/2016 | |
| EP | 3 245 855 A1 | 11/2017 | |
| WO | 2016/191825 A1 | 12/2016 | |
| WO | WO 2018/191767 | 10/2018 | |

OTHER PUBLICATIONS

Austrian Search Report, A 184/2019, dated Sep. 27, 2019.
Office Action issued in European Patent Application No. 20172749.2 dated Feb. 2, 2023.
Deter, "Precision cultivatorTreffler TG 615", https://www.topagrar.com/technik/news/praezisionsgrubber-treffler-tg-615-9359936.html, Aug. 17, 2015, 9 total pages.
Kuper, "Travel Report Precise against Weeds", LANDfreund, https://www.treffler.net/fileadmin/user_data/dokumente/news/treffler-praezisions-federzahnegge-praxisbericht-von-landfreund.pdf, Sep. 2014, 3 total pages.

* cited by examiner

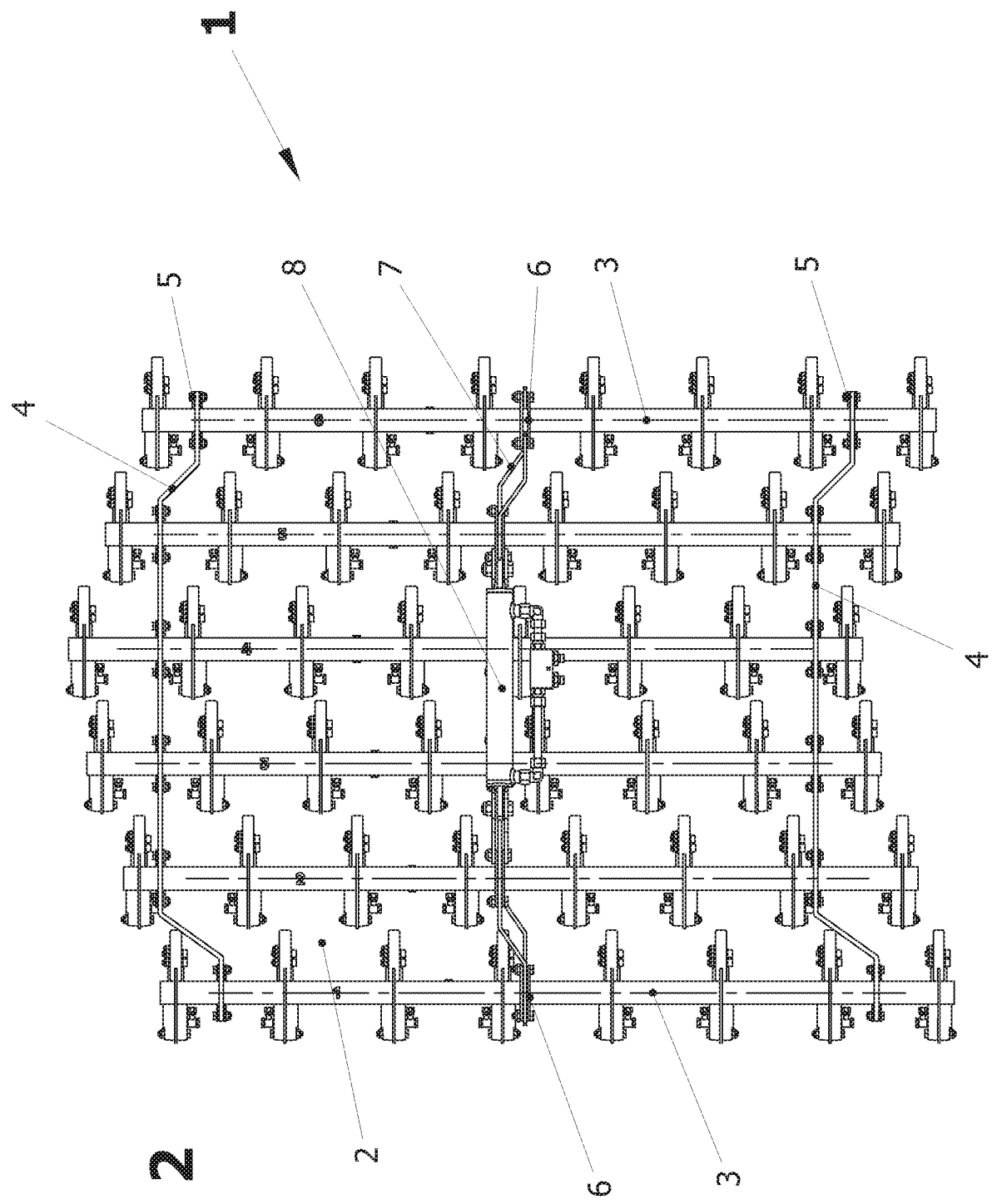

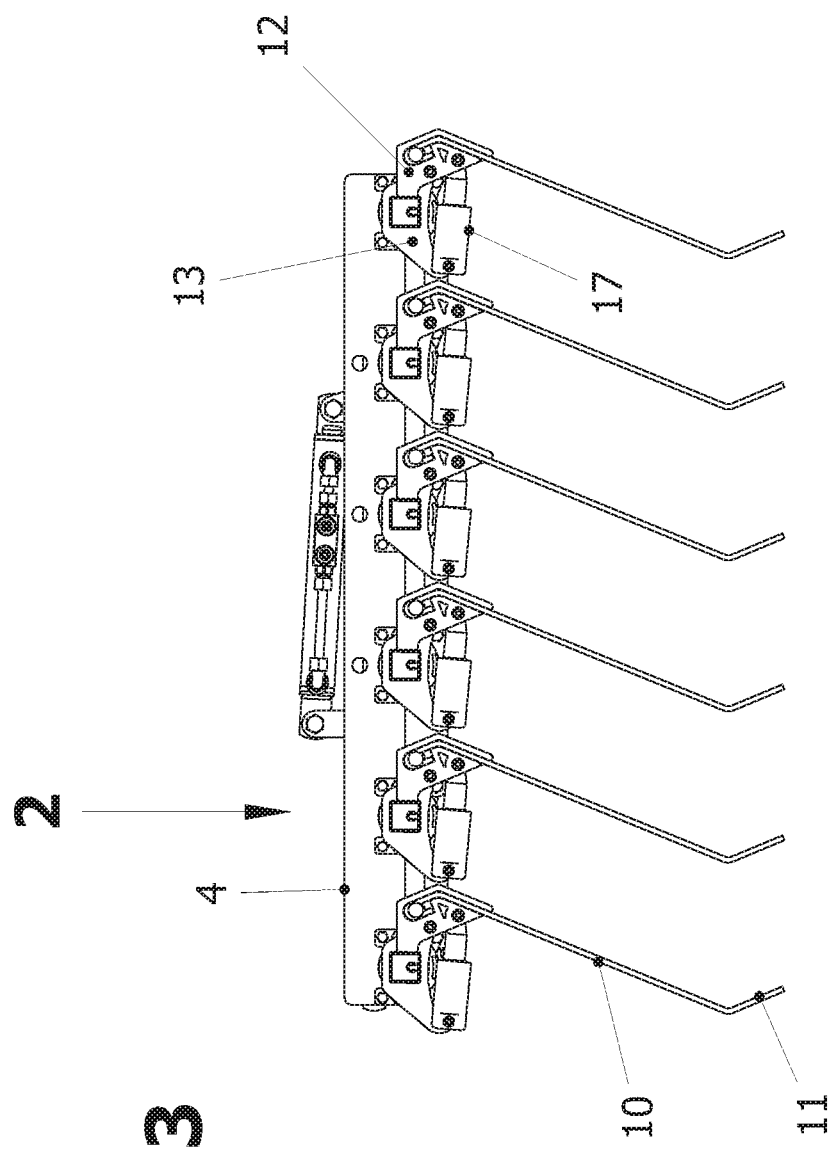

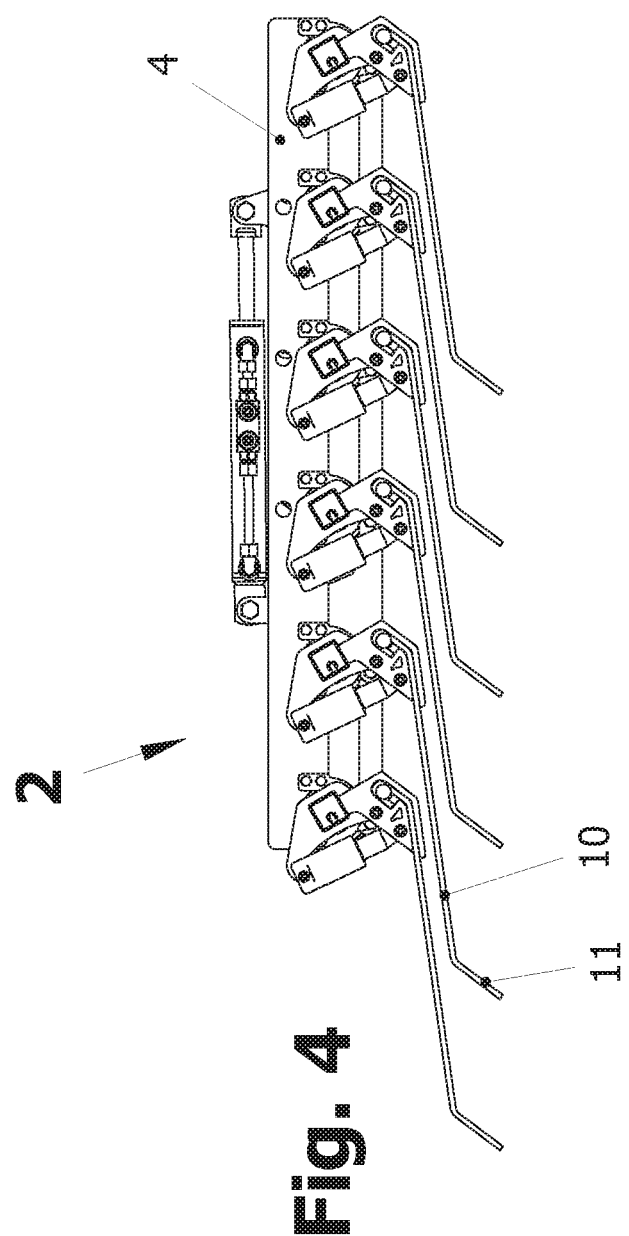

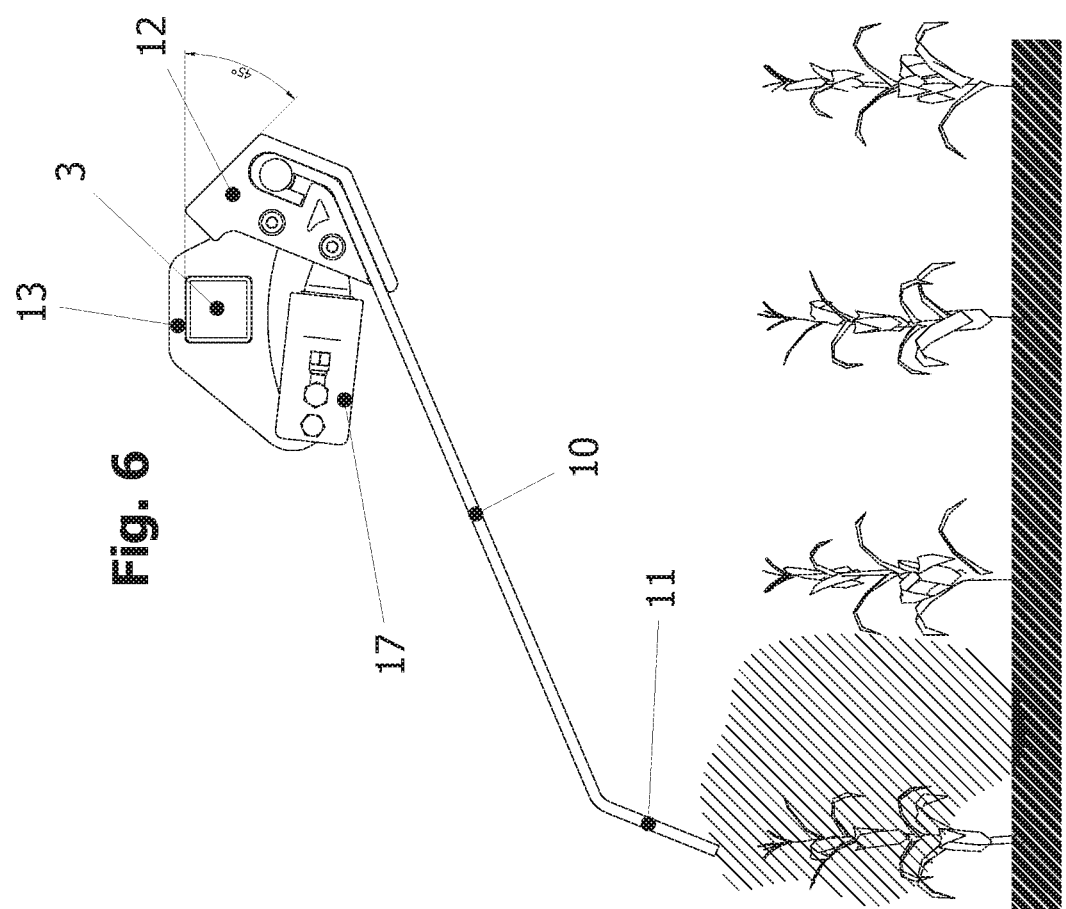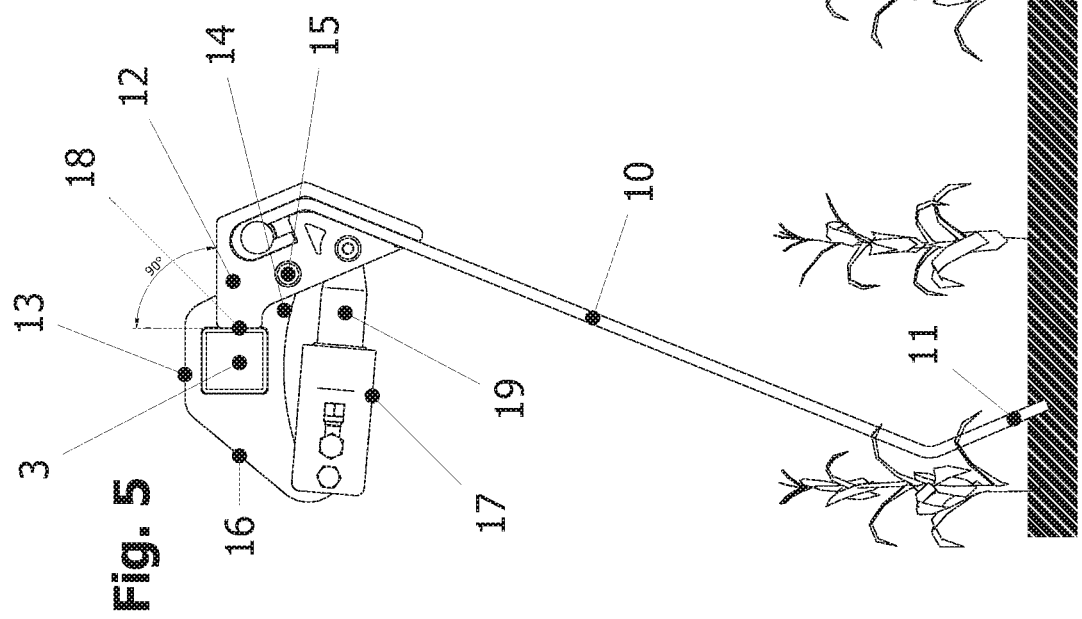

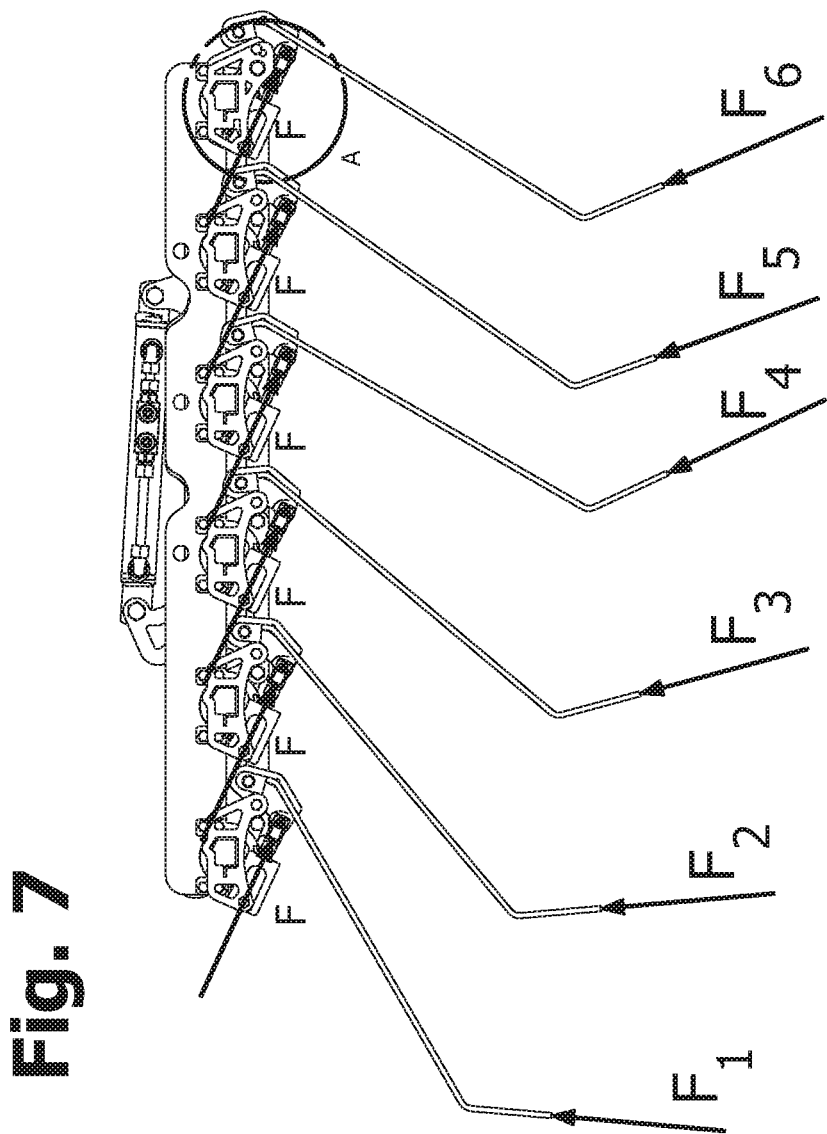

SOIL CULTIVATION DEVICE

BACKGROUND OF THE INVENTION

Field of the Invention

The invention relates to a soil cultivation device.

Description of the Related Art

Such devices, which are also called harrows, are known. For example, reference is made to the "original harrows" shown and described in the pamphlet "Hatzenbichler AUSTRIAN-AGRO-TECHNIK." This known harrow has a supporting frame with multiple tie bars, to which harrow tines are fastened. The harrow tines comprise a triple-spiral section, so that during cultivation of the soil, the tines can be used to remove weeds from fields with crops, such as grains, soy, corn, sunflowers, strawberries, sugar beets, canola, and the like.

Another generic soil cultivation device is known from EP 1 961 283 B1. This known soil cultivation device, which is intended in particular for cultivating land areas for crops, has a supporting frame and multiple harrow tines that are arranged to pivot on the supporting frame. In addition, an adjustment system assigned to the harrow tines is provided.

By means of the adjustment system, the pretensioning of the harrow tines that are pretensioned via springs can be adjusted. In the case of the soil cultivation device that is known from EP 1 961 283 B1, it is problematic that the harrow tines are pretensioned with coil springs, which is not only a considerable expense, but is also susceptible to breakdown.

Soil cultivation devices with flexible tools that work soil in furrows are known from DE 199 56 953 A1, US 2019/0045700 A1, and DE 10 2016 107 951 A1.

Generic soil cultivation devices ("harrows") are known from U.S. Pat. Nos. 5,492,182 A, 6,164,386 A, US 2012/0073844 A1, and WO 2018/191767 A1.

WO 2018/191767 A1 shows a generic soil cultivation device with pivotable, bearing-mounted harrow tines, wherein the ends of the harrow tines that project over the bearings are coupled to coil springs. The hydraulic cylinder mentioned in WO 2018/191767 A1 is not used to move the harrow tines or to load them elastically, but rather to adjust a frame relative to the base rack.

In the case of this known soil cultivation device, it is disadvantageous that the force that acts with the coil springs on the harrow tines varies with the pivot bearing of the harrow tines.

The cultivator for furrowing soil cultivation, known from DE 10 2016 107 951 A1, has spring tines with at least one spring coil. In this case, the pretensioning is to be adjustable. To this end, DE 10 2016 107 951 A1 proposes providing a supporting element (paragraph [0020], FIGS. 2a-2d). Paragraph [0021] of DE 10 2016 107 951 A1 mentions—without more exact information as to how this can be achieved—setting the pretensioning of the spring elements with a hydraulic or pneumatic actuator and/or a spring and/or damping element. Also, in the case of the embodiment of the cultivator of DE 10 2016 107 951 A1, the spring action is itself determined by the spring coil of the spring tine. DE 10 2016 107 951 A1 does not disclose a swinging-out of the spring tine by means of a pivotable bearing.

SUMMARY OF THE INVENTION

The object of the invention is to make available a soil cultivation device of the above-mentioned type, in which the harrow tines are prestressed into their operating position and—relative to the working direction—do not make transverse movements (oscillations) to a significant extent.

This object is achieved according to the invention with a soil cultivation device as disclosed. Preferred and advantageous configurations of the soil cultivation device according to the invention are also disclosed.

In the invention, it is provided that the prestressing springs that place a load on the harrow tines in their operating position are pneumatic springs. Since the pneumatic springs are compressed by compressed air via pressure-regulating valves, it is ensured that the force with which the harrow tines are loaded is of equal value in all pivoting positions of the harrow tines, i.e., also is not greater in the case of increasing pivoting of the harrow tines.

Since, in the case of the soil cultivation device according to the invention, the operating position of the harrow tines is determined by a stop that is arranged on the supporting frame and since a pneumatic spring is assigned to each harrow tine, which spring pretensions the harrow tine in its operating position, not only is a cultivation that is safe for the crops provided for the purpose of removing weeds, but transverse movements (movements of the harrow tines crosswise to the working direction) are also avoided completely or at least to a large extent. In a practical embodiment of the soil cultivation device according to the invention, the harrow tines are fastened to levers that for their part are mounted to pivot on the supporting frame, in particular on tie bars of the supporting frame.

In an embodiment of the soil cultivation device according to the invention, it is provided that the pneumatic springs act, on the one hand, on the carriers on which the levers are mounted to pivot with the tines, and, on the other hand, on the levers at some distance from the swivel axes of the levers.

In the case of the soil cultivation device according to the invention, it can be provided that the tie bars are mounted to rotate in the supporting frame, so that the harrow tines can be pivoted from a working position (=operating position) into a transport position, wherein the harrow tines are brought toward the supporting frame in the transport position.

BRIEF DESCRIPTION OF THE DRAWINGS

Additional details and features of the invention follow from the description below of a preferred embodiment of the soil cultivation device according to the invention based on the drawings. Here:

FIG. 2 shows a top view on the soil cultivation device of FIG. 1,

FIG. 3 shows a side view of the soil cultivation device of FIG. 1, wherein the harrow tines are in operating position, FIG. 4 shows the soil cultivation device of FIG. 1 with harrow tines that are pivoted into transport position, FIG. 5 shows a detail of the bearing of the harrow tines and the springs assigned thereto, FIG. 6, in a view similar to FIG. 5, shows the position of the harrow tine when the latter collides with an obstacle (stone), and FIG. 7 shows the tine pressures exerted by the harrow tines.

DESCRIPTION OF THE PREFERRED EMBODIMENTS

Figure 1:
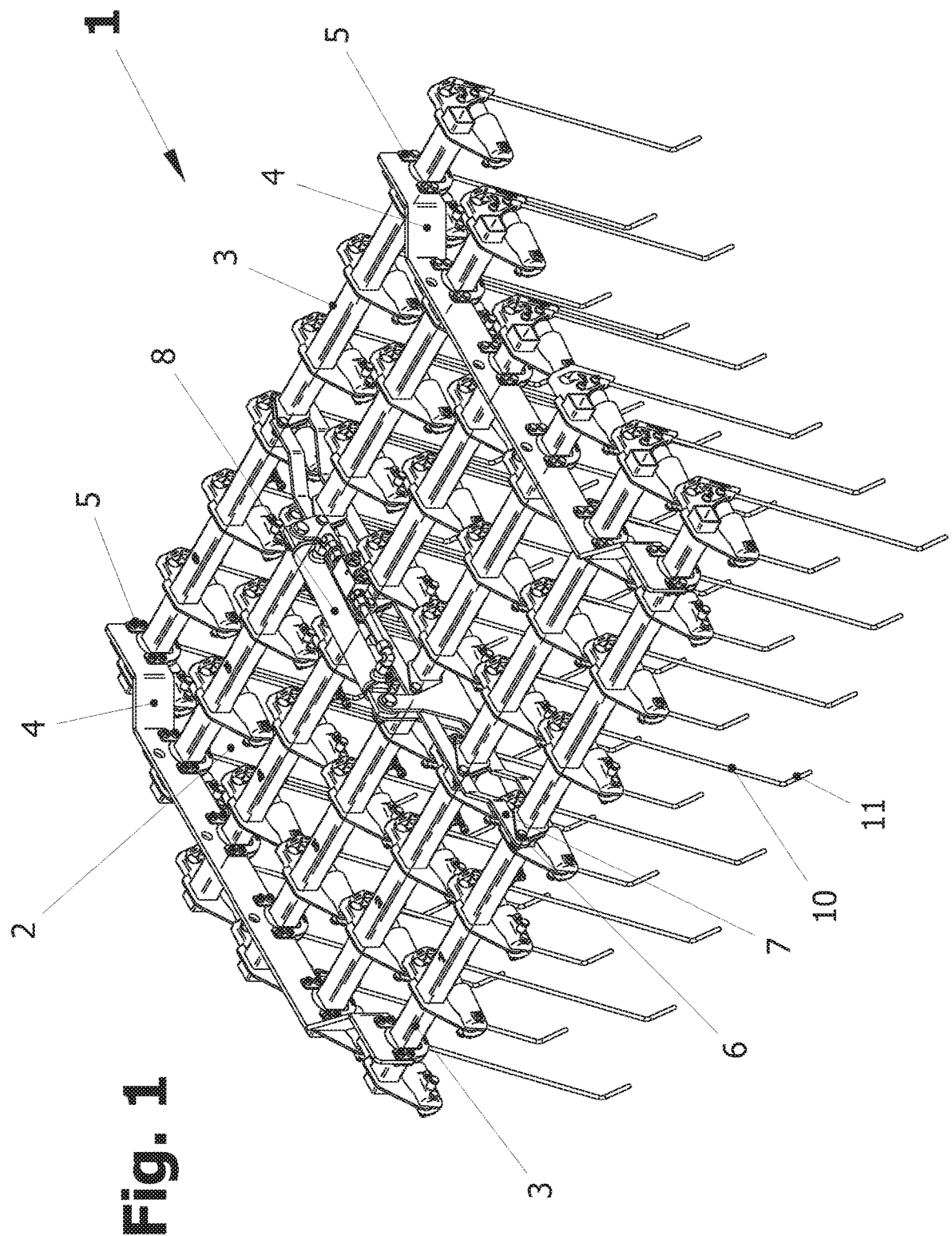
FIG. 1 shows a soil cultivation device in an oblique view.

A soil cultivation device 1 according to the invention comprises a supporting frame 2, which in the embodiment that is shown has six tie bars 3. The tie bars 3 are connected to one another via walls 4 that are arranged laterally in the supporting frame 2. In this case, the tie bars 3 in the walls 4 are mounted to rotate in bearings 5, so that the tie bars 3 can be rotated around axes that are parallel to their longitudinal extensions.

To rotate the tie bars 3, arms 6 are fastened to them, which arms are connected to one another via coupling rods 7. The connections of the free ends of the arms 6 to the coupling rods 7 are designed as articulations, so that the tie bars 3 can be rotated by means of a hydraulic cylinder 8 by adjusting the coupling rods 7. Thus, the harrow tines 10 can be pivoted from the operating position (=working position) shown in FIG. 3 into the readiness position (=transport position) shown in FIG. 4.

The harrow tines 10 that consist of spring steel have angled free ends 11, wherein for soil cultivation, the angled ends 11 drive into the soil in order to remove weeds (cf. FIG. 5).

The harrow tines 10 are fastened to levers 12. The levers 12 are mounted to pivot on carriers 13, wherein the carriers 13 are fastened to the tie bars 3 of the supporting frame 2. On one arm 14 of the carriers 13 that are essentially designed with two arms, the levers 12 are mounted to pivot via bearings 15. On the other arm 16 of the carrier 13, a pneumatic cylinder 17, which acts as a pneumatic spring, is supported by articulation. The piston 19 of the pneumatic cylinder 17 is connected by articulation to the lever 12, which carries the harrow tines 10. The position at which the pneumatic cylinder 17 is connected to the lever 12 is at some distance from the pivot bearing 15 of the lever 13.

The levers 12 have bearing surfaces 18 that are arranged on the side of the lever 12 that is opposite the position at which the piston 19 of the pneumatic cylinder 17 acts on the lever 12 and the end that is away from the harrow tines 10. In the operating position of the harrow tines 10 that is shown in FIG. 5, the bearing surface 18 is adjacent to a lateral surface of the tie bar 3, on which the harrow tine 10 is mounted to pivot.

By compressing the pneumatic cylinders 17, the latter act as springs, and the harrow tines 10 are prestressed into their operating position, in which the bearing surfaces 18 are adjacent to the tie bars 3. Nevertheless, the harrow tines 10, in particular when they collide with an obstacle, as is shown in FIG. 6, can pivot when the pneumatic cylinder 17 is compressed and can go around the obstacle without the harrow tines 10 being damaged.

The pneumatic cylinders 17 are compressed by compressed air via pressure-regulating valves. Thus, it is possible to keep the tine pressure at the free ends 11 of the harrow tines 10 at equal value in all pivot bearings of the harrow tines 10. This applies not only for the pivot bearings of the harrow tines 10 shown in FIGS. 5 and 6 but also for the entire pivoting area between the pivot bearings of the harrow tines 10 shown in FIGS. 5 and 6.

FIG. 7 shows the tine pressure ($F_1$ to $F_6$) that is exerted by harrow tines 10 in various pivot bearings. In the case of the soil cultivation device 1 according to the invention, $F_1=F_2=F_3=F_4=F_5=F_6$.

In summary, an embodiment of the invention can be described as follows:

In the case of a soil cultivation device 1 with multiple harrow tines 10, the harrow tines 10 are fastened to levers 12, which are mounted to pivot on the tie bars 3 of the supporting frame 2 via carriers 13. By virtue of the fact that the levers 12 are adjacent to the tie bars 3, the operating position of the harrow tines 10 is defined, and the harrow tines 10 are prestressed into the operating position by springs assigned to them in the form of pneumatic cylinders 17.

The invention claimed is:

1. A soil cultivation device (1), comprising:
   a supporting frame (2) that includes a tie bar (3); and
   multiple harrow tines (10) arranged to pivot on the supporting frame (2),
   wherein one spring each is assigned to the harrow tines (10),
   wherein an operating position of the harrow tines (10) is determined by a stop arranged on the supporting frame (2),
   wherein the harrow tines (10) are prestressed into their operating position by the springs,
   wherein the springs are pneumatic springs, charged by compressed air via pressure-regulating valves and configured to maintain, for each tine, a tine pressure applied at a free end of the tine having an equal value in all pivot positions of the tine.

2. The soil cultivation device according to claim 1,
   wherein the harrow tines (10) are fastened to levers (12), and
   wherein the levers (12) are mounted to pivot on the supporting frame (2).

3. The soil cultivation device according to claim 2, wherein the levers (12) are mounted to pivot on tie bars (3) of the supporting frame (2) via carriers (13).

4. The soil cultivation device according to claim 2, wherein the levers (12) can pivot independently of one another.

5. The soil cultivation device according to claim 3, wherein the pneumatic springs are supported on the carriers (13) and are adjacent to the levers (12) at a distance from bearings (15) of the levers (12) on the carriers (13).

6. The soil cultivation device according to claim 3, wherein in the operating position of the harrow tines (10), one end of the lever (12) is adjacent to the tie bar (3) of the supporting frame (2) that is used as a stop, to which supporting frame the carrier (13) is also fastened.

7. The soil cultivation device according to claim 1, wherein the tie bars (3), on which the harrow tines (10) are arranged, are mounted to rotate in the supporting frame (2).

8. The soil cultivation device according to claim 7, wherein the tie bars (3) are mounted to rotate in lateral walls (4) of the supporting frame (2).

9. The soil cultivation device according to claim 7,
   wherein arms (6) are fastened to the tie bars (3),
   wherein the free ends of the arms (6) are connected to one another via a coupling rod (7), and
   wherein for actuating the coupling rod (7), a linear motor, which is supported in the supporting frame (2), is provided.

10. The soil cultivation device according to claim 3, wherein the levers (12) can pivot independently of one another.

11. The soil cultivation device according to claim 4, wherein the springs are supported on the carriers (13) and are adjacent to the levers (12) at a distance from bearings (15) of the levers (12) on the carriers (13).

12. The soil cultivation device according to claim 10, wherein the springs are supported on the carriers (13) and are adjacent to the levers (12) at a distance from bearings (15) of the levers (12) on the carriers (13).

13. The soil cultivation device according to claim 4, wherein in the operating position of the harrow tines (10), one end of the lever (12) is adjacent to the tie bar (3) of the supporting frame (2) that is used as a stop, to which supporting frame the carrier (13) is also fastened.

14. The soil cultivation device according to claim 5, wherein in the operating position of the harrow tines (10), one end of the lever (12) is adjacent to the tie bar (3) of the supporting frame (2) that is used as a stop, to which supporting frame the carrier (13) is also fastened.

15. The soil cultivation device according to claim 2, wherein the tie bars (3), on which the harrow tines (10) are arranged, are mounted to rotate in the supporting frame (2).

16. The soil cultivation device according to claim 3, wherein the tie bars (3), on which the harrow tines (10) are arranged, are mounted to rotate in the supporting frame (2).

17. The soil cultivation device according to claim 4, wherein the tie bars (3), on which the harrow tines (10) are arranged, are mounted to rotate in the supporting frame (2).

18. The soil cultivation device according to claim 5, wherein the tie bars (3), on which the harrow tines (10) are arranged, are mounted to rotate in the supporting frame (2).

19. The soil cultivation device according to claim 9, wherein the linear motor is a hydraulic cylinder (8).

20. A soil cultivation device (1), comprising:
a supporting frame (2) that includes a tie bar (3); and
multiple harrow tines (10) arranged to pivot on the supporting frame (2),
wherein one spring each is assigned to the harrow tines (10),
wherein the operating position of the harrow tines (10) is determined by a stop arranged on the supporting frame (2),
wherein the harrow tines (10) are prestressed into their operating position by the springs,
wherein the springs are pneumatic cylinders (17), charged by compressed air via pressure-regulating valves,
wherein the harrow tines (10) are fastened to levers (12),
wherein the levers (12) are mounted to pivot on the supporting frame (2),
wherein the levers (12) are mounted to pivot on tie bars (3) of the supporting frame (2) via carriers (13),
wherein the pneumatic cylinders (17) are supported on the carriers (13) and are adjacent to the levers (12) at a distance from the bearings (15) of the levers (12) on the carriers (13), and
wherein the pneumatic cylinders (17) are configured to maintain a tine pressure, applied at a free end of each tine, at an equal value in all pivot positions of the tine.

* * * * *